US012374797B2

(12) United States Patent
Atkinson et al.

(10) Patent No.: US 12,374,797 B2
(45) Date of Patent: Jul. 29, 2025

(54) PATCH ANTENNA WITH GROUND WELL

(71) Applicant: Trimble Inc., Westminster, CO (US)

(72) Inventors: John Atkinson, Christchurch (NZ); Shawn Weisenburger, Westminster, CO (US); Gregory Wallace, San Francisco, CA (US)

(73) Assignee: Trimble Inc., Westminster, CO (US)

( * ) Notice: Subject to any disclaimer, the term of this patent is extended or adjusted under 35 U.S.C. 154(b) by 209 days.

(21) Appl. No.: 18/210,921

(22) Filed: Jun. 16, 2023

(65) Prior Publication Data

US 2024/0421488 A1 Dec. 19, 2024

(51) Int. Cl.

| | |
|---|---|
| ***H01Q 1/38*** | (2006.01) |
| ***H01Q 1/36*** | (2006.01) |
| ***H01Q 1/48*** | (2006.01) |
| ***H01Q 9/04*** | (2006.01) |
| ***H01Q 21/28*** | (2006.01) |

(52) U.S. Cl.

CPC ............. *H01Q 9/0414* (2013.01); *H01Q 1/36* (2013.01); *H01Q 1/48* (2013.01); *H01Q 21/28* (2013.01)

(58) Field of Classification Search

CPC ............ H01Q 1/288; H01Q 1/36; H01Q 1/38; H01Q 1/42; H01Q 1/422; H01Q 1/48; H01Q 9/0407; H01Q 9/0414; H01Q 21/08; H01Q 21/28

See application file for complete search history.

(56) References Cited

U.S. PATENT DOCUMENTS

| | | | | |
|---|---|---|---|---|
| 2007/0080864 | A1* | 4/2007 | Channabasappa ... | H01Q 9/0442 343/700 MS |
| 2007/0171138 | A1* | 7/2007 | Noro .................... | H01Q 1/1214 343/700 MS |
| 2016/0261047 | A1* | 9/2016 | Wallace .................. | H01Q 5/40 |
| 2021/0135368 | A1* | 5/2021 | Rogers ................. | H01Q 9/0457 |

(Continued)

FOREIGN PATENT DOCUMENTS

| | | | |
|---|---|---|---|
| EP | 1 775 795 A1 | 4/2007 | |
| WO | WO-2014190652 A1 * | 12/2014 | .......... H01Q 9/0414 |

OTHER PUBLICATIONS

2014.*

Extended European Search Report for Application No. 24181400. 3-1201, mailed Oct. 25, 2024, 23 pages.

*Primary Examiner* — Thai Pham

(74) *Attorney, Agent, or Firm* — Kilpatrick Townsend & Stockton LLP

(57) ABSTRACT

A Global Navigation Satellite System (GNSS) patch antenna can include a middle laminate, a top laminate, a bottom laminate, and a ground well. The middle laminate can include a first side and a second side. The top laminate can be coupled to the middle laminate and can be positioned on the first side of the middle laminate. The top laminate can include an electrically conductive antenna element configured to receive GNSS signals. The bottom laminate can be coupled to the middle laminate and can be positioned on the second side of the middle laminate. The ground well can cover exposed surfaces of the bottom laminate and exposed portions of the second side of the middle laminate and can comprise electrically conductive material. Some of the surface of the middle laminate that is covered by the bottom laminate can be free from the electrically conductive material.

17 Claims, 7 Drawing Sheets

(56) References Cited

U.S. PATENT DOCUMENTS

| | | | | |
|---|---|---|---|---|
| 2022/0052434 | A1* | 2/2022 | Brockett | H01Q 1/38 |
| 2022/0216614 | A1* | 7/2022 | Rogers | H01Q 15/004 |
| 2024/0162617 | A1* | 5/2024 | Batra | H01Q 5/40 |

* cited by examiner

PATCH ANTENNA WITH GROUND WELL

BACKGROUND

This disclosure relates in general to patch antennas that can be used for receiving and/or transmitting electrical signals. Patch antennas can be used, for example, with a global navigation system or other suitable systems to receive data, transmit data, or a combination thereof with respect to the system. Conventional patch antennas may be limited to small ranges of frequencies, intensities, or the like for receiving signals, transmitting signals, or a combination thereof. For example, manufacturing limitations may not allow the conventional patch antennas to receive or transmit signals in desired frequency ranges, intensity ranges, or the like.

SUMMARY

This disclosure relates to patch antennas, and without limitation to a patch antenna that includes a ground well. A ground well may be or include a U-shaped ground plane. The patch antenna may be configured to be used with respect to a global navigation satellite system (GNSS). The GNSS patch antenna can include a top laminate, a middle laminate, and a bottom laminate, where the ground well is formed on a lower, exposed surface of the center laminate and side and lower, exposed surfaces of the bottom laminate. The top laminate can include at least one electrically conductive antenna element. At least one electrically conductive antenna element and the ground well can include electrically conductive material such as copper, silver, aluminum, etc. The ground well may increase (e.g., compared to a conventional planar ground plane) the volume of the GNSS patch antenna for optimizing (e.g., increasing) a frequency range of signals that can be successfully received by the GNSS patch antenna.

In certain embodiments, a Global Navigation Satellite System (GNSS) patch antenna can include a top laminate, a middle laminate, a bottom laminate, and a ground well. The middle laminate can include a first side and a second side opposite the first side. The top laminate can be coupled to the middle laminate and can be positioned on the first side of the middle laminate. The top laminate can include at least one electrically conductive antenna element configured to receive GNSS signals. The bottom laminate can be coupled to the middle laminate and can be positioned on the second side of the middle laminate. The ground well can be formed on exposed surfaces of the bottom laminate (i.e., sides and lower surface) and at least an exposed portion of a surface of the second side of the middle laminate. The ground well can be formed by plating with an electrically conductive material. At least a portion of the surface of the middle laminate that is covered by the bottom laminate can be free from the electrically conductive material.

In an embodiment, the at least one electrically conductive antenna element can have a geometrical shape similar to a geometrical shape of the top laminate, and the at least one electrically conductive antenna element can include copper. In an embodiment, the middle laminate can define a first three-dimensional shape, the top laminate can define a second three-dimensional shape, and the bottom laminate can define a third three-dimensional shape. At least two dimensions of each of the first three-dimensional shape, the second three-dimensional shape, and the third three-dimensional shape can be geometrically similar. In an embodiment, the first three-dimensional shape, the second three-dimensional shape, and the third three-dimensional shape can each be differently sized cylindrical shapes, and the first three-dimensional shape can have a first radius that is larger than a second radius of the second three-dimensional shape and a third radius of the third three-dimensional shape. In an embodiment, the GNSS patch antenna can additionally include a set of channels that can extend from an upper one of the at least one electrically conductive antenna element included in the top laminate to a first side of the bottom laminate. The first side of the bottom laminate can be positioned opposite from a second side of the bottom laminate that is adjacent to the second side of the middle laminate. In an embodiment, the GNSS patch antenna can additionally include a set of conduction pins corresponding to the set of channels. Each conduction pin of the set of conduction pins can be positioned in a different channel of the plurality of channels. In an embodiment, each conduction pin of the set of conduction pins can include a set of vias connected by one or more connection pads, and each conduction pin of the set of conduction pins can be adjacent to but may not contact electrically conductive elements in the middle laminate or the bottom laminate. In an embodiment, the ground well can increase a volume of the GNSS patch antenna to optimize a detectable frequency range associated with the GNSS patch antenna.

In another embodiment, a system can include a first Global Navigation Satellite System (GNSS) patch antenna and a second GNSS patch antenna. The first GNSS patch antenna can include a first middle laminate, a first top laminate, a first bottom laminate, and a first ground well. The first middle laminate can include a first side and a second side opposite the first side. The first top laminate can be coupled to the first middle laminate and can be positioned on the first side of the first middle laminate. The first top laminate can include at least one first electrically conductive antenna element that can be configured to receive GNSS signals. The first bottom laminate can be coupled to the first middle laminate and can be positioned on the second side of the first middle laminate. The first ground well can be formed on exposed surfaces of the first bottom laminate and at least an exposed portion of a surface of the second side of the first middle laminate. The first ground well can be formed by plating with an electrically conductive material. At least a portion of the surface of the first middle laminate that is covered by the first bottom laminate can be free from the electrically conductive material. The second GNSS patch antenna can include a second middle laminate, a second top laminate, a second bottom laminate, and a second ground well. The second middle laminate can include a third side and a fourth side opposite the third side. The second top laminate can be coupled to the second middle laminate and can be positioned on the third side of the second middle laminate. The second top laminate can include the at least one second electrically conductive antenna element. The second bottom laminate can be coupled to the second middle laminate and can be positioned on the fourth side of the second middle laminate. The second ground well can be formed on exposed surfaces of the second bottom laminate and at least an exposed portion of a surface of the fourth side of the second middle laminate. The second ground well can be formed by plating with an electrically conductive material. At least a portion of the surface of the second middle laminate that is covered by the second bottom laminate can be free from the electrically conductive material.

In an embodiment, the at least one first electrically conductive antenna element can have a geometrical shape similar to a geometrical shape of the first top laminate and can include copper, and the at least one second electrically conductive antenna element can have a geometrical shape similar to a geometrical shape of the second top laminate and can include copper. In an embodiment, the first middle laminate can define a first three-dimensional shape, the first top laminate can define a second three-dimensional shape, the first bottom laminate can define a third three-dimensional shape, and at least two dimensions of each of the second three-dimensional shape and the third three-dimensional shape can be geometrically similar. Additionally, the second middle laminate can define a fourth three-dimensional shape, the second top laminate can define a fifth three-dimensional shape, the second bottom laminate can define a sixth three-dimensional shape, and at least two dimensions of each of the fifth three-dimensional shape and the sixth three-dimensional shape can be geometrically similar. In an embodiment, the second three-dimensional shape and the third three-dimensional shape can be differently sized cylindrical shapes, the fifth three-dimensional shape and the sixth three-dimensional shape can be differently sized cylindrical shapes, and the first three-dimensional shape and the fourth three-dimensional shape can be substantially the same shape and different than the second three-dimensional shape, the third three-dimensional shape, the fifth three-dimensional shape, and the sixth three-dimensional shape. In an embodiment, the first three-dimensional shape can be the same as the fourth three-dimensional shape, the second three-dimensional shape can be the same as the fifth three-dimensional shape, the third three-dimensional shape can be the same as the sixth three-dimensional shape, and the first GNSS patch antenna can be identical to the second GNSS patch antenna.

In an embodiment, the system can additionally include a first set of channels and a second set of channels. The first set of channels can extend from an upper one of the at least one first electrically conductive antenna element included in the first top laminate to a first side of the first bottom laminate. The first side of the first bottom laminate can be positioned opposite from a second side of the first bottom laminate that is adjacent to the second side of the first middle laminate. Additionally, the second set of channels can extend from an upper one of the at least one second electrically conductive antenna element included in the second top laminate to a first side of the second bottom laminate. The first side of the second bottom laminate can be positioned opposite from a second side of the second bottom laminate that is adjacent to the second side of the second middle laminate. In an embodiment, the system can additionally include a first set of conduction pins and a second set of conduction pins. The first set of conduction pins can correspond to the first set of channels, and each conduction pin of the first set of conduction pins can be positioned in a different channel of the first set of channels. Additionally, the second set of conduction pins can correspond to the second set of channels, and each conduction pin of the second set of conduction pins can be positioned in a different channel of the second set of channels.

In an embodiment, each conduction pin of the first set of conduction pins can include a first set of vias connected by one or more connection pads, and each conduction pin of the first set of conduction pins can be adjacent to but may not contact electrically conductive elements in the first middle laminate or the first bottom laminate. Additionally, each conduction pin of the second set of conduction pins can include a second set of vias connected by one or more connection pads, and each conduction pin of the second set of conduction pins can be adjacent to but may not contact electrically conductive elements in the second middle laminate or the second bottom laminate. In an embodiment, the first ground well can increase a volume of the first GNSS patch antenna to optimize a detectable frequency range associated with the first GNSS patch antenna, and the second ground well can increase a volume of the second GNSS patch antenna to optimize a detectable frequency range associated with the second GNSS patch antenna. In an embodiment, the system can additionally include an antenna board that can include the first GNSS patch antenna and the second GNSS patch antenna. The first middle laminate of the first GNSS patch antenna and the second middle laminate of the second GNSS patch antenna can be a common middle laminate of the antenna board and can be shared by the first GNSS patch antenna and the second GNSS patch antenna. The first bottom laminate can be at substantially the same height as the second bottom laminate. The first GNSS patch antenna and the second GNSS patch antenna can be arranged laterally offset from one another.

In yet another embodiment, a ground well layer for a Global Navigation Satellite System (GNSS) patch antenna can include a housing and a set of channels. The housing can have a first side and a second side. The first side can be coupled to a first side of a middle laminate of the GNSS patch antenna, and the second side can be plated with an electrically conductive material. The set of channels can extend through the housing.

In an embodiment, each channel of the set of channels can be sized to receive a different conduction pin of a set of conduction pins. Each conduction pin of the set of conduction pins can be configured to extend within a respective channel of the set of channels and from the ground well layer to a patch included in a top laminate of the GNSS patch antenna. The top laminate can be positioned on a second side opposite the first side of the middle laminate.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The present disclosure is described in conjunction with the appended figures.

Figure 1:
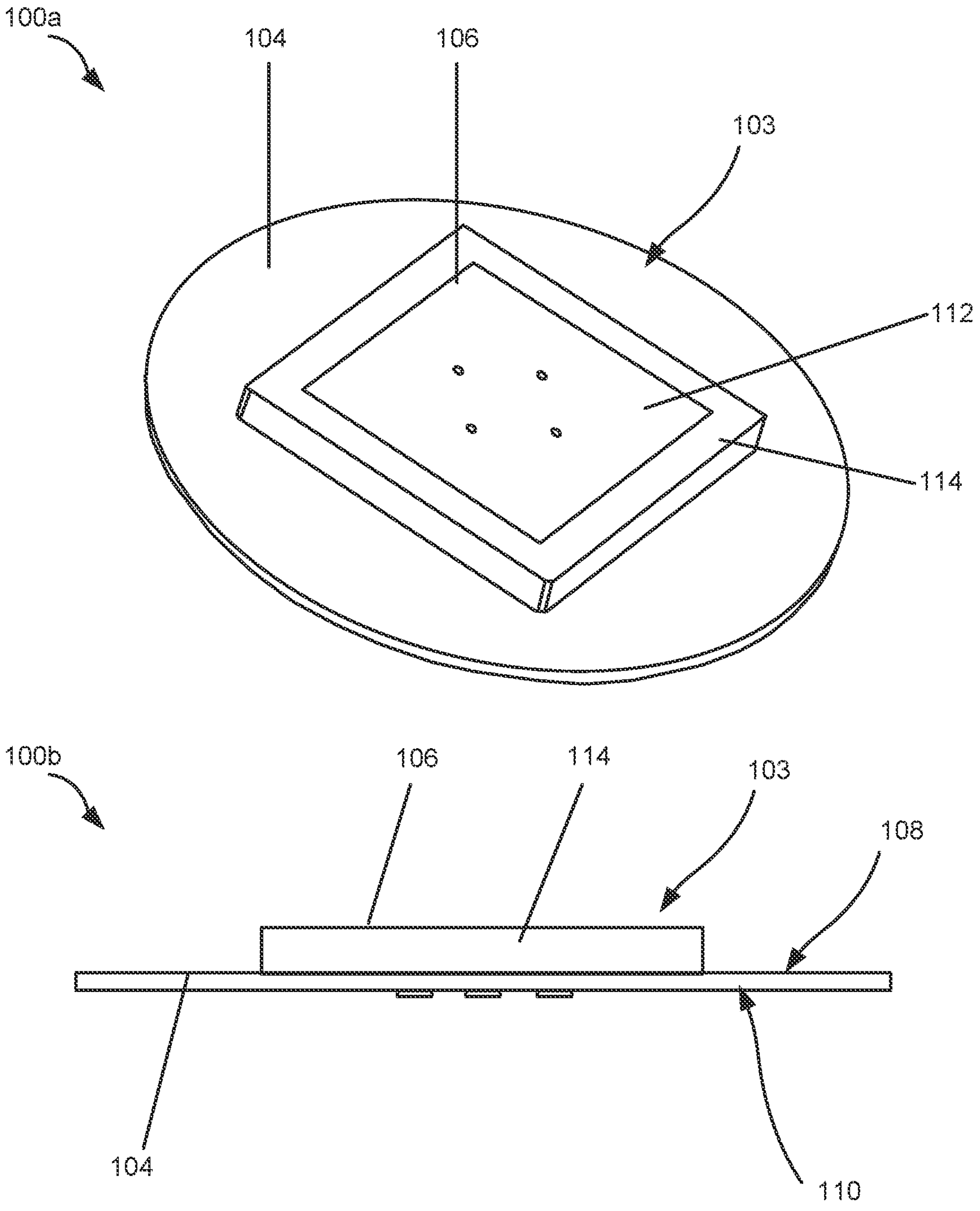
FIG. 1 depicts a perspective view and a side view of a patch antenna.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure, without limitation, relates to a patch antenna that includes a ground well for receiving and/or transmitting signals. The signals may originate and/or terminate at a communication system, such as a global navigation satellite system (GNSS), though other suitable communication systems, such as radio transmission systems, computer systems, and the like can be used with respect to the patch antenna. The patch antenna may include a bottom laminate, a middle laminate, a top laminate, and any other suitable components for the patch antenna. The ground well may include or be formed on one or more portions of the middle laminate, one or more portions of the bottom laminate, etc. For example, the ground well may be formed on lower, exposed portions of the middle laminate, side and lower, exposed portions of the bottom laminate, or a combination thereof.

The middle laminate, the top laminate, and the bottom laminate may be coupled to one another. For example, the top laminate may be positioned abutting and coupled with a first side of the middle laminate, and the bottom laminate may be positioned abutting and coupled with a second side of the middle laminate opposite the first side. The top laminate of the patch antenna may include an electrically conductive antenna element that can receive signals from a communication system. In a particular example, the top laminate can include at least one electrically conductive antenna element that can receive GNSS signals. In a particular example, the top laminate can include a first electrically conductive antenna element positioned on a first side of the top laminate and a second electrically conductive antenna element positioned within or on a second side opposite the first side of the top laminate.

In some embodiments, the bottom laminate of the patch antenna can include one or more exposed surfaces and one or more non-exposed surfaces. The one or more non-exposed surfaces may be positioned abutting the middle laminate, and the one or more exposed surfaces may be positioned opposite the one or more non-exposed surfaces and facing away from the middle laminate. In a particular example, the one or more exposed surfaces may form or otherwise be included in a bottom surface of the patch antenna. Additionally or alternatively, the one or more exposed surfaces may include an electrically conductive material forming at least a part of the ground well. For example, the one or more exposed surfaces may include a plated, exterior layer of the electrically conductive material. Examples of the electrically conductive material can include copper, silver, aluminum, titanium, other electrically conductive elements, any alloys thereof, or any combination thereof. In some embodiments, the ground well of the patch antenna may include the electrically conductive material on the one or more exposed portions of the bottom laminate and one or more exposed portions of the middle laminate. In these embodiments, the one or more exposed portions of the bottom laminate and the one or more exposed portions of the middle laminate may include at least an exterior surface that is plated with the electrically conductive material.

In some embodiments, the patch antenna, for example each component thereof, may include a set of channels extending from a first side of the patch antenna to a second side, opposite the first side, of the patch antenna. In a particular example, each channel of the set of channels, or any subset thereof, can extend from the top laminate, or the electrically conductive antenna element thereof, to the second side, which may be or include the one or more exposed surfaces of the bottom laminate, of the patch antenna. Additionally, each channel of the set of channels, or any other subset thereof, may be sized to receive a different conduction pin of a set of conduction pins. The set of conduction pins may include a number of conduction pins similar or identical to a number of channels of the set of channels. Additionally, each conduction pin of the set of conduction pins may be positioned in a different channel of the set of channels to conduct signals between the one or more electrically conductive antenna elements and electrical circuitry configured to process the signals. In some embodiments, each conduction pin of the set of conduction pins may include one or more vias plated or filled with an electrically conductive material. A via may be or include at least a portion of the respective conduction pin. For example, a particular conduction pin can include three separate plated vias, extending through each of the top, middle, and bottom laminates, coupled together to form the particular conduction pin, though any other number (e.g., less than three or more than three) of vias can be used to form the particular conduction pin.

The patch antenna with the ground well can be used for various applications. In one particular example, the patch antenna may be or include a GNSS patch antenna that can be configured to receive signals from a GNSS transmitter. The GNSS transmitter, which in some examples may be positioned in a satellite or may be communicatively coupled with the satellite, may transmit one or more signals, and the GNSS patch antenna may receive the one or more signals, for example via the one or more electrically conductive antenna elements, the set of conduction pins, or the like.

In another example, the patch antenna may be included in a set of antenna patches that can be positioned on a common antenna board. The common antenna board can include a common (e.g., single) middle laminate that may be shared among each antenna patch included in the set of antenna patches, or any subset thereof. Additionally, each patch antenna may include a different top laminate and a different bottom laminate compared to other patch antennas of the set of patch antennas. The common antenna board may be sized, shaped, or otherwise dimensioned to receive one or more signals from a transmitter. The transmitter can transmit the one or more signals toward the common antenna board (e.g., the transmitter can be communicatively coupled with the set of antennas of the common antenna board) or can otherwise suitably transmit the one or more signals such that the set of antenna patches can receive the one or more signals. The transmitter can be or include a radio transmitter, a computer transmitter, or any other suitable transmitter that can transmit the one or more signals that can be detected or otherwise received by the set of antenna patches.

In some embodiments, the structure of the patch antenna may provide various functional improvements for the patch antenna. In a particular example, the combination of the top laminate, the middle laminate, and the bottom laminate, along with the ground well, the set of conduction pins, and the like can allow impedance of received signals to be processed or otherwise controlled with the patch antenna and without transmitting the received signals to a separate board. Additionally, the ground well of the patch antenna may provide an increased or optimized (e.g., compared to other patch antennas) volume of the patch antenna that can optimize (e.g., increase) a frequency range of signals that the patch antenna can receive.

The following illustrative examples are presented to introduce the reader to the general subject matter discussed herein and are not intended to limit the scope of the disclosed concepts. The following sections describe various additional features and examples with reference to the drawings in which like numerals indicate like elements and directional descriptions are used to describe the illustrative aspects but, like the illustrative aspects, should not be used to limit the present disclosure. Additionally, the presented figures are generally described with respect to computer modeling operations, but the general subject matter discussed herein is not limited to computer modeling operations.

Referring first to FIG. 1, a perspective view 100*a* and a side view 100*b* of a patch antenna 103 is depicted. As illustrated, the patch antenna 103 includes a middle laminate 104, which may be or include a ground plane, such as a planar ground plane, and a top laminate 106, though the patch antenna 103 may include additional or alternative components or combinations of components. The middle laminate 104 can include a first side 108 and a second side 110. The second side 110 may be positioned opposite the first side 108. Additionally, the middle laminate 104 may be or include electrically conductive material. In a particular example, an exterior, plated layer of the middle laminate may be or include electrically conductive material such as copper, silver, aluminum, titanium, any other conductive element, any alloy thereof, or any combination thereof.

The top laminate 106 may be positioned on or otherwise abutting the first side 108 of the middle laminate 104. For example, the top laminate 106 may be coupled (e.g., mechanically, chemically, etc.) to the first side 108 of the middle laminate 104, may be formed integrally with respect to the first side 108 of the middle laminate 104, or the like. Additionally, the top laminate 106 may include an electrically conductive antenna element 112, a laminate portion 114, and any other suitable component for the top laminate 106. The electrically conductive antenna element 112, or any other suitable component of the patch antenna 103, can be positioned to receive one or more signals, for example from a transmitter of or communicatively coupled with a global navigation satellite system (GNSS). In some embodiments, the electrically conductive antenna element 112 may define a first shape that may be geometrically similar to a second shape defined by the top laminate 106. In a particular example, the electrically conductive antenna element 112 may be a square or a circle, and the top laminate 106 may also be a square or a circle that is at least slightly larger than the square or the circle of the electrically conductive antenna element 112. Although described as a square or a circle, the electrically conductive antenna element 112 and/or the top laminate 106 may be or include other suitable shapes such as rectangles, ovals, triangles, irregular shapes, etc.

The electrically conductive antenna element 112 may be or include electrically conductive material such as copper, silver, aluminum, titanium, any other conductive element, any alloy thereof, or any combination thereof. In one particular example, the electrically conductive antenna element 112 may be or include copper or copper alloy, and the middle laminate 104 may be or include the same or similar copper or copper alloy. Additionally, the laminate portion 114 of the top laminate 106 may be or include a non-metallic material that may be electrically insulating. For example, the laminate portion 114 of the top laminate 106 may be or include a dielectric material, a ceramic material, an electrically insulating polymeric material, laminate materials, other non-conductive materials, or any combination thereof. The laminate portion 114 may be formed integrally with, or otherwise mechanically or chemically coupled with, the electrically conductive antenna element 112 to form the top laminate 106.

Figure 2:
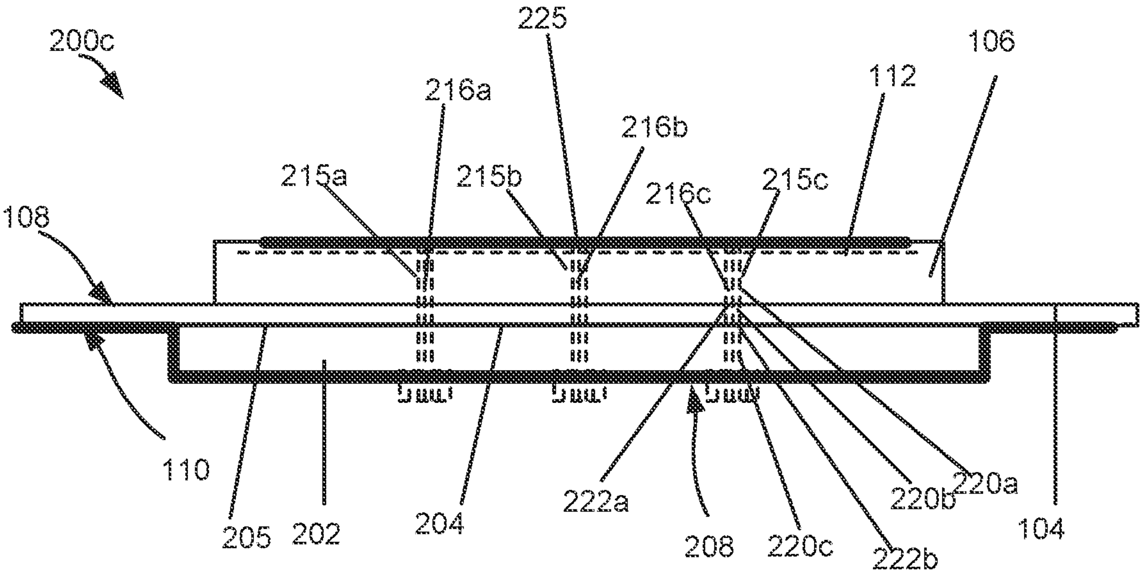
FIG. 2 depicts a sectional side view of a patch antenna with a ground well according to an embodiment.

FIG. 2 is a sectional side view 200 of a patch antenna 102 with a ground well 208 according to an embodiment. As illustrated, the patch antenna 102 can include a bottom laminate 202, a middle laminate 104, and a top laminate 106, though the patch antenna 102 can include additional or alternative components for receiving GNSS or other suitable signals. The middle laminate 104 may include the first side 108 and the second side 110 positioned opposite the first side 108. Additionally, the top laminate 106 may be positioned on or otherwise abutting the first side 108 of the middle laminate 104.

The ground well 208 may increase (e.g., compared to other patch antennas) a volume of the patch antenna 102 to optimize a detectable frequency range associated with the patch antenna 102. The ground well 208 forms a ground plane disposed on a bottom or lower surface of the patch antenna 102. The bottom laminate 202 may be positioned on or abutting the second side 110 of the middle laminate 104. For example, one or more non-exposed portions 204 of the bottom laminate 202 may be positioned on or otherwise coupled with at least a portion 205 (e.g., a central portion) of the second side 110 of the middle laminate 104. The portion 205 of the second side 110 of the middle laminate 104 may be free from electrically conductive material, may be partially coated or plated with an electrically non-conductive material, or the like. One or more exposed portions 206 of the bottom laminate 202 may be positioned or otherwise arranged facing away from or distal with respect to the second side 110 of the middle laminate 104. For example, an electrically conductive material on the one or more exposed portions 206 of the bottom laminate 202 may form or be included in the ground well 208 of the patch antenna 102. In a particular example, an electrically conductive material on the one or more exposed portions 206 of the bottom laminate 202 may form a first component 210*a* of the ground well 208 of the patch antenna 102, and an electrically conductive material on one or more lower exposed portions 212 of the middle laminate 104 may form a second component 210*b* of the ground well 208 of the patch antenna 102. Additionally, the ground well 208 may be positioned adjacent or otherwise proximate to external circuitry (e.g., a printed circuit board assembly) that can process or otherwise receive signals received by the patch antenna 102.

Additionally, the top laminate 106 may include one electrically conductive antenna element, two electrically conductive antenna elements, or more electrically conductive antenna elements. In a particular example, and as illustrated in FIG. 2, the top laminate 106 of the patch antenna 102 can include the electrically conductive antenna element 112 and a second electrically conductive antenna element 225. The electrically conductive antenna element 112 and a second electrically conductive antenna element 225 may be separated by a dielectric or other type of laminate material layer.

In some embodiments, the patch antenna 102 can include one or more channels 215 such as channels 215*a-c*. While the sectional side view 200 of FIG. 2 illustrates three channels, any suitable number of channels can be included as feeds in the patch antenna 102 (e.g., less than three or more than three). Each channel of the channels 215*a-c* may extend from a first end of the patch antenna 102 to a second end of the patch antenna 102. In a particular example, each channel of the channels 215*a-c* may extend from the second electrically conductive antenna element 225, which may be included on the top laminate 106, to circuitry that may be integrated with or separate from the patch antenna 200. Each channel of the channels 215*a-c* may be substantially similar or identical to one another. For example, each channel of the channels 215*a-c* may have a similar or identical radius with respect to other channels of the channels 215*a-c*, may have a similar or identical length with respect to other channels of the channels 215*a-c*, may have similar or identical numbers and/or types of components, such as vias, with respect to other channels of the channels 215*a-c*, and the like. In other embodiments, one or more of the channels 215*a-c* may have one or more different dimensions or other properties with respect to other channels of the channels 215*a-c*.

Additionally, each channel of the channels 215*a-c* may be sized, oriented, or otherwise arranged to receive a different conduction pin of conduction pins 216*a-c*. As illustrated in the sectional side view 200, the conductions pins 216*a-c* include three conduction pins, though other suitable numbers (e.g., less than three or more than three) of conduction pins may be included in the patch antenna 102. Each conduction pin of the conduction pins 216*a-c* may be positioned in a different channel of the channels 215*a-c*. For example, conduction pin 216*a* may be positioned in channel 215*a*, conduction pin 216*b* may be positioned in channel 215*b*, and conduction pin 216*c* may be positioned in channel 215*c*, though any permutation thereof may be possible.

In some embodiments, each conduction pin of the conduction pins 216*a-c* may include a set of vias that can be connected by one or more connection pads. In a particular example, the conductions pin 216*c* can include vias 220*a-c*, which can be connected together using connection pads 222*a-b*. Via 220*a* can be connected to via 220*b* using connection pad 222*a*, and via 220*b* can be connected to via 220*c* using connection pad 222*b*. For example, respective vias of the vias 220*a-c* can be soldered to respective connection pads of the connections pads 222*a-b* such that the conduction pin 216*c* does not electrically contact electrically conductive elements in the middle laminate 104 or electrically conductive elements in the bottom laminate 202.

Figure 3:
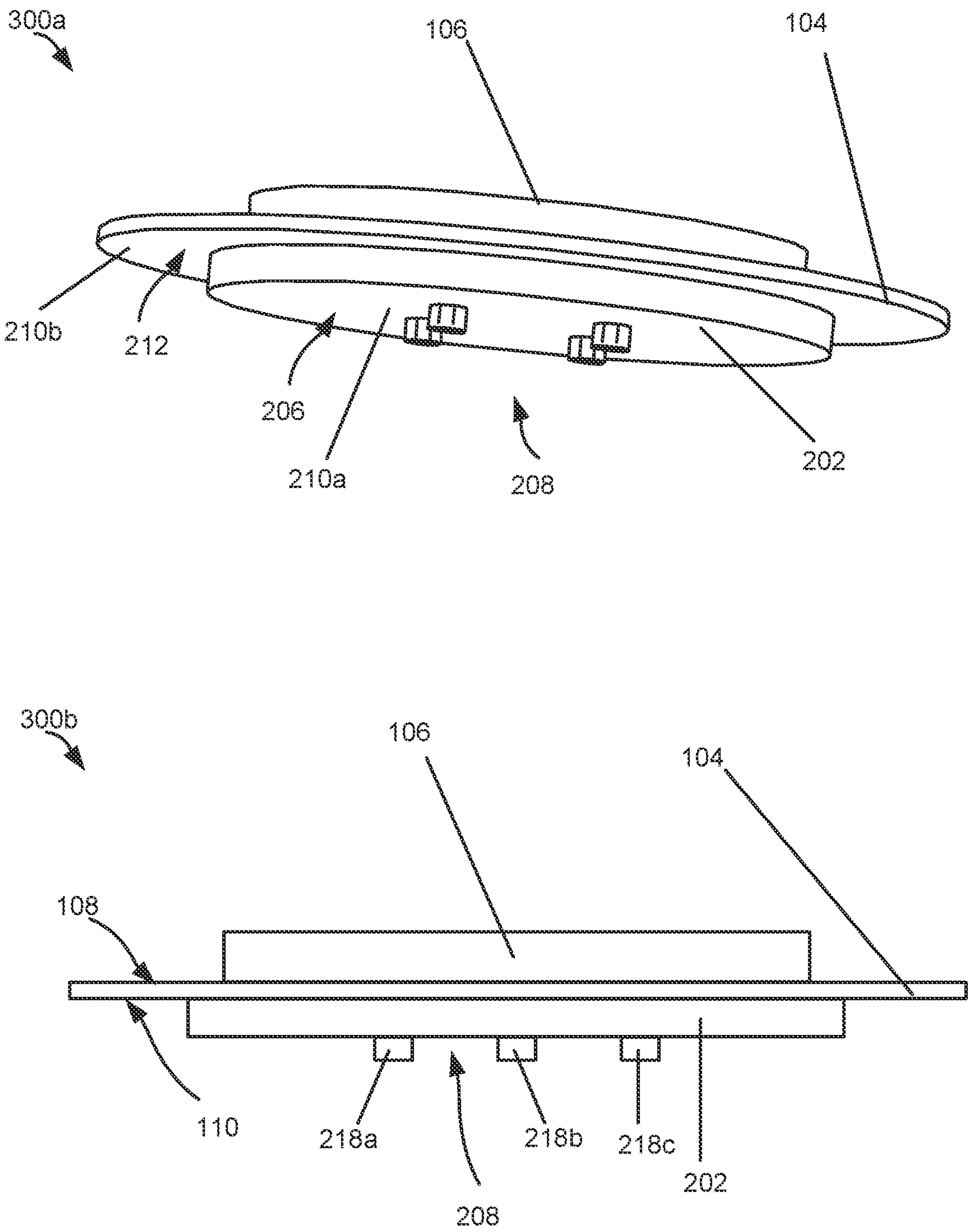
FIG. 3 depicts a perspective view and a side view of a patch antenna with a ground well according to an embodiment.

FIG. 3 is a perspective view 300*a* and a side view 300*b* of the patch antenna 102 with the ground well 208 according to an embodiment. As illustrated, the patch antenna 102 can include the bottom laminate 202, the middle laminate 104, and the top laminate 106, though the patch antenna 102 can include additional or alternative components for receiving GNSS or other suitable signals. The middle laminate 104 may include the first side 108 and the second side 110 positioned opposite the first side 108. Additionally, the top laminate 106 may be positioned on or otherwise abutting the first side 108 of the middle laminate 104. In some embodiments, a distance, which can be measured from the bottom laminate 202 to the top laminate 106 may be less than or approximately 4 mm, 6 mm, 8 mm, 10 mm, 12 mm, 14 mm, 16 mm, 18 mm, 20 mm, etc. For example, the middle laminate 104, the top laminate 106, and the bottom laminate 202 may each be less than or approximately 2 mm, 3 mm, 4 mm, 5 mm, 6 mm, 7 mm, 8 mm, 9 mm, etc. in thickness. The middle laminate 104, the top laminate 106, and the bottom laminate 202 may have similar or identical height or other dimensions, or the middle laminate 104, the top laminate 106, and the bottom laminate 202 may have differing heights or other dimensions.

In some embodiments, the middle laminate 104 can define a first three-dimensional shape, the top laminate 106 can define a second three-dimensional shape, and the bottom laminate 202 can define a third three-dimensional shape. Additionally, at least two dimensions of each of the first three-dimensional shape, the second three-dimensional shape, and the third three-dimensional shape may be geometrically similar. In a particular example, for example as illustrated in FIG. 3, the middle laminate 104, the top laminate 106, and the bottom laminate 202 may define a first cylinder, a second cylinder, and a third cylinder, respectively. The first cylinder, the second cylinder, and the third cylinder may have different heights, different radii, or other different dimensions but may otherwise have other dimensions that are substantially the same or similar with respect to one another. While described and illustrated as cylinders (or cylinder-like shapes), the middle laminate 104, the top laminate 106, and/or the bottom laminate 202 may be or otherwise define other suitable shapes such as cubes, rectangular prisms, irregular three-dimensional shapes, and the like.

The ground well 208 may increase (e.g., compared to other patch antennas) a volume of the patch antenna 102 to optimize a detectable frequency range associated with the patch antenna 102. The bottom laminate 202 may be positioned on or abutting the second side 110 of the middle laminate 104. For example, one or more non-exposed portions 204 of the bottom laminate 202 may be positioned on or otherwise coupled with at least the portion 205, which may be free from electrically conductive material, may be partially coated or plated with an electrically non-conductive material, or the like. One or more exposed portions 206 of the bottom laminate 202 may be positioned or otherwise arranged facing away from or distal with respect to the second side 110 of the middle laminate 104. For example, an electrically conductive material on the one or more exposed portions 206 of the bottom laminate 202 may form or be included in the ground well 208 of the patch antenna 102. In a particular example, an electrically conductive material on the one or more exposed portions 206 of the bottom laminate 202 may form the first component 210*a* of the ground well 208 of the patch antenna 102, and an electrically conductive material on one or more lower exposed portions 212 of the middle laminate 104 may form the second component 210*b* of the ground well 208 of the patch antenna 102. Additionally, the bottom laminate 202 may be positioned adjacent or otherwise proximate to external circuitry (e.g., a printed circuit board assembly) that can process or otherwise receive signals received by the patch antenna 102.

In some embodiments, the ground well 208, or any component thereof, such as the one or more exposed portions 206 of the bottom laminate 202, the one or more lower exposed portions 212 of the middle laminate 104, or a combination thereof, may be or include a conductive material. For example, parts of the ground well 208 covering the one or more exposed portions 206 of the bottom laminate 202, the one or more lower exposed portions 212 of the middle laminate 104, or a combination thereof, may be or include electrically conductive material such as copper, silver, aluminum, titanium, any other conductive element, any alloy thereof, one or more conductive polymeric materials, or any combination thereof. In some embodiments, parts of the ground well 208 covering the one or more exposed portions 206 of the bottom laminate 202 and the one or more lower exposed portions 212 of the middle laminate 104 can be formed from or include similar an identical material. In a particular example, parts of the ground well 208 covering the one or more exposed portions 206 of the bottom laminate 202 and the one or more lower, exposed portions 212 of the middle laminate 104 can include copper or a copper alloy. In another particular example, parts of the ground well 208 covering the one or more exposed portions 206 of the bottom laminate 202 and the one or more lower exposed portions 212 of the middle laminate 104 can be formed by plating with similar or identical material during a common process to manufacture the patch antenna 102.

Figure 4:
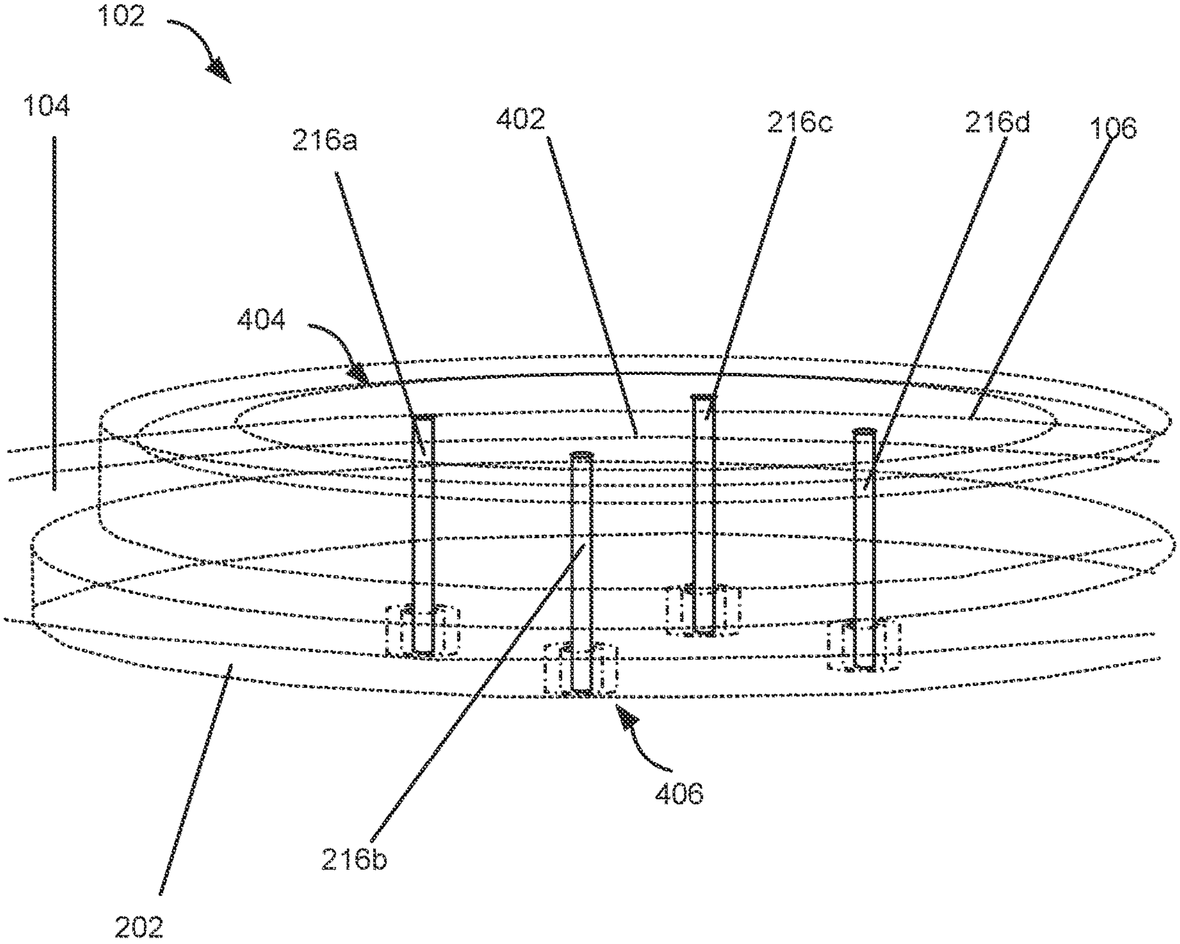
FIG. 4 depicts a perspective view of a set of conduction pins of the patch antenna of FIG. 2 according to an embodiment.

FIG. 4 is a perspective view of a set of conduction pins 216*a-d* of the patch antenna 102 according to an embodiment. As illustrated, the patch antenna 102 includes four conduction pins 216*a-d*, though any other suitable number (e.g., less than four or more than four) of conduction pins may be included in the patch antenna 102. Additionally, the set of conduction pins 216*a-d* are illustrated as being arranged in approximately a square shape around a central point 402 of the top laminate 106, but the set of conduction pins 216*a-d* can otherwise suitably be arranged in the patch antenna 102 to optimize a detection frequency range of the patch antenna 102. For example, the set of conduction pins 216*a-d* can be arranged in approximately a circle shape, an oval shape, a rectangular shape, irregular shapes, or the like around the central point 402.

As illustrated in FIG. 4, each conduction pin of the conduction pins 216*a-c* can extend from a first end 404 of the patch antenna 102 to a second end 406 of the patch antenna 102. In some embodiments, the first end 404 of the patch antenna 102 may be near or adjacent to an outer surface of the patch antenna 102. For example, the first end 404 may coincide with the electrically conductive antenna element 112 or the second electrically conductive antenna element 225 of the top laminate 106. Additionally, the second end 406 of the patch antenna 102 may coincide with an exterior (e.g., outwardly facing) surface of the bottom laminate 202 such as one or more portions of the ground well 208. In a particular example, each conduction pin of the conduction pins 216*a-c* may extend from the first end 404 of the patch antenna 102 to the second end 406 of the patch antenna 102.

In some embodiments, each conduction pin of the set of conduction pins 216*a-d* can extend through the middle laminate 104, for example from the first end 404 of the patch antenna 102 to the second end 406 of the patch antenna 102. Additionally, while the set of conduction pins 216*a-d* is illustrated as being arranged approximately in a square shape around the central point 402, the set of conduction pins 216*a-d* can be otherwise suitably arranged. For example, the set of conduction pins 216*a-d* may be arranged approximately in a circle about the central point 402, a rectangle about the central point 402, irregularly spaced about the central point 402, arranged about a different point or different set of points, etc. In some embodiments, one or more conduction pins of the set of conduction pins 216*a-d* may extend through the middle laminate 104 without electrically contacting the middle laminate 104 or any component or portion thereof.

Figure 5:
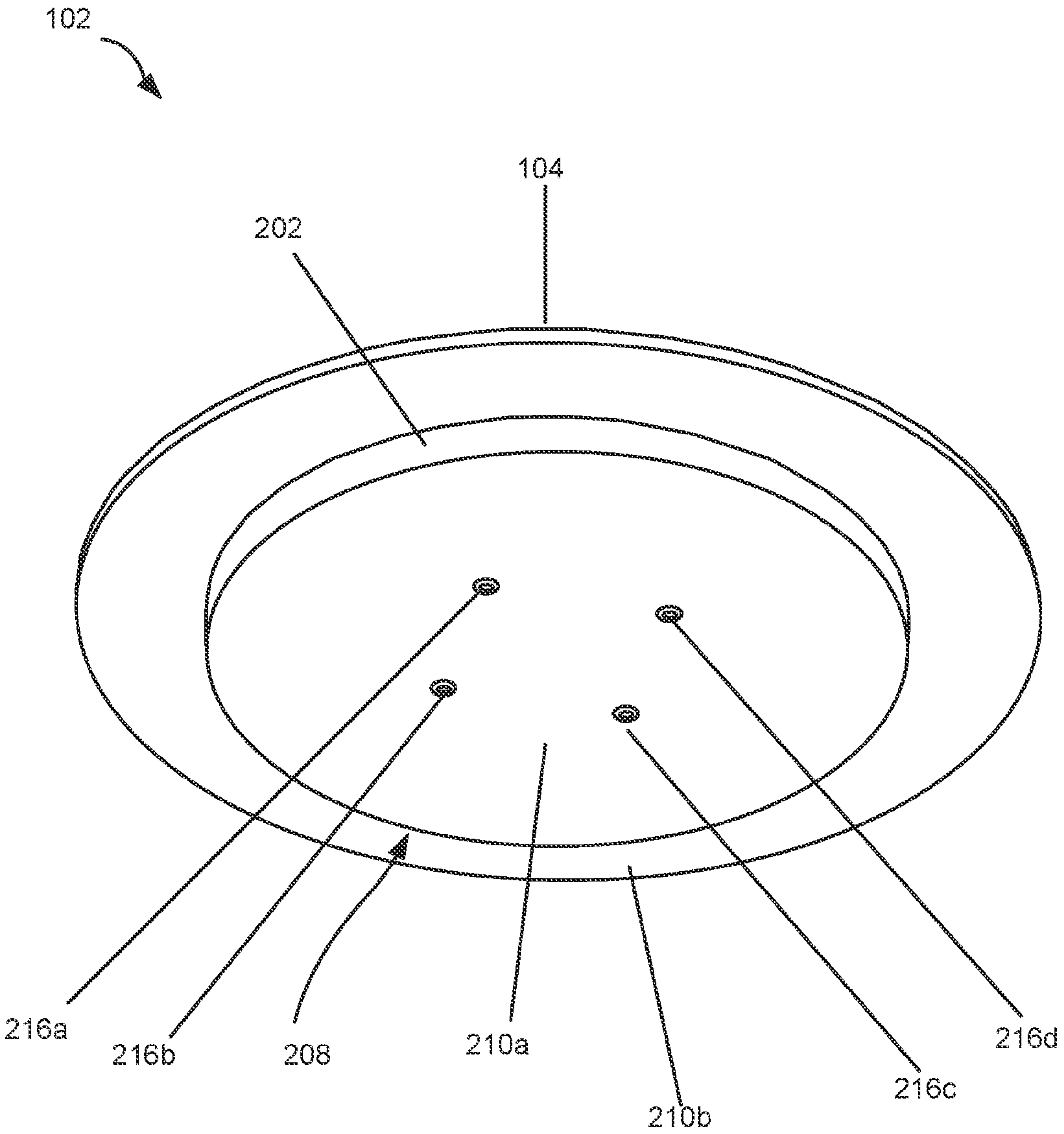
FIG. 5 depicts a bottom perspective view of the patch antenna of FIG. 2 according to an embodiment.

FIG. 5 is a bottom perspective view of the patch antenna 102 according to an embodiment. As illustrated in FIG. 5, the patch antenna 102 can include the middle laminate 104 and the bottom laminate 202, though the patch antenna 102 may additionally or alternatively include any other suitable component or combination of components. Additionally, the patch antenna 102 can include the set of conduction pins 216*a-d* that can be arranged around a central point on the ground well 208 of the patch antenna 102. The ground well 208 can include the first component 210*a*, which may be formed on an exterior surface of the bottom laminate 202, and the second component 210*b*, which may be formed on a lower exterior surface of the middle laminate 104 oriented in the same or similar direction as the exterior surface of the bottom laminate 202.

In some embodiments, the first component 210*a* and the second component 210*b* may form a monolithic electrical ground plane for the patch antenna 102. For example, the ground well 208, which may include the first component 210*a* and the second component 210*b*, may be or include a continuous surface plated with or otherwise including an electrically conductive material that can function as a ground plane for the patch antenna 102. The ground well 208 may define a cross-sectional shape that can include a U shape, a step shape, or other suitable shape for the cross section of the ground well 208.

Figure 6:
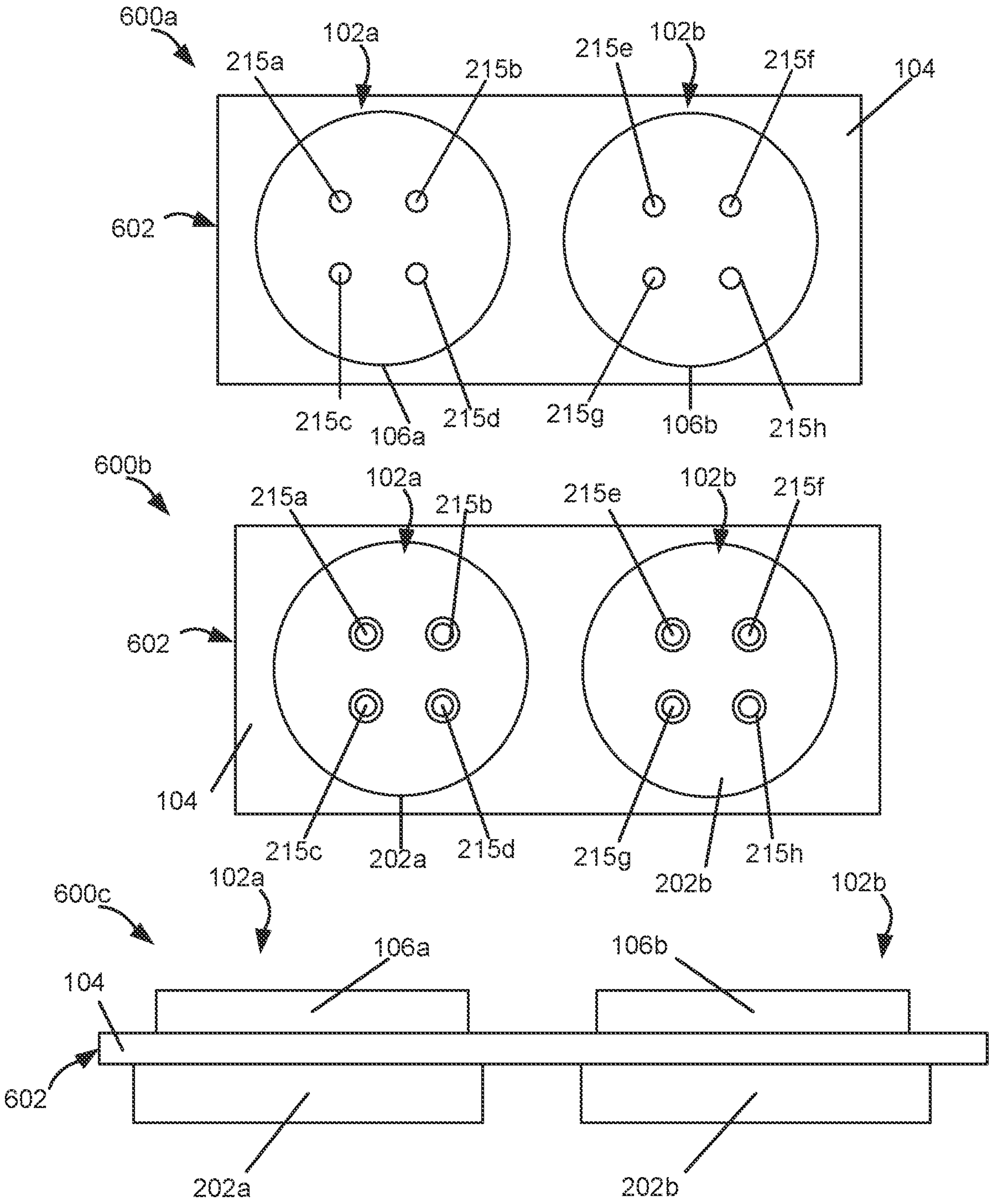
FIG. 6 depicts a diagram of an antenna board that includes a set of antenna patches according to an embodiment.

FIG. 6 is a set of views 600*a-c* of a diagram of an antenna board 602 that includes a set of patch antennas 102*a-b* according to an embodiment. The view 600*a* may be or include a top view of the antenna board 602, the view 600*b* may be or include a bottom view of the antenna board 602, and the view 600*c* may be or include a side view of the antenna board 602. As illustrated in FIG. 6, the antenna board 602 includes two patch antennas 102*a-b*, though any other suitable number (e.g., less than two or more than two) of patch antennas may be possible. Additionally, though the patch antennas 102*a-b* are illustrated as being positioned on the antenna board 602 in a single row, the patch antennas 102*a-b* can be otherwise arranged (e.g., in an array, in a circle, etc.) for adjusting a function or an orientation of the antenna board 602.

In some embodiments, each patch antenna of the patch antennas 102*a-b* may include a separate top laminate, a separate bottom laminate, and a separate set of channels. For example, (i) the patch antenna 102*a* may include the top laminate 106*a*, the bottom laminate 202*a*, and the set of channels 215*a-d*, and (ii) the patch antenna 102*b* may include the top laminate 106*b*, the bottom laminate 202*b*, and the set of channels 215*e-h*, though any suitable permutation thereof can be possible. Additionally, each channel of the channels 215*a-h* may include or otherwise be sized to receive a different conduction pin that may extend from the respective top laminate, or any electrically conductive antenna element thereof, through the respective bottom laminate.

In some embodiments, the antenna board 602 may include or may be a middle laminate. For example, the antenna board 602 may be a common middle laminate that can be shared among each patch antenna of the patch antennas 102*a-b*. In other embodiments, the antenna board 602 may be or include a printed circuit board or printed circuit board assembly that includes one or more middle laminates that may be shared by or distributed among the patch antennas 102*a-b*.

Figure 7:
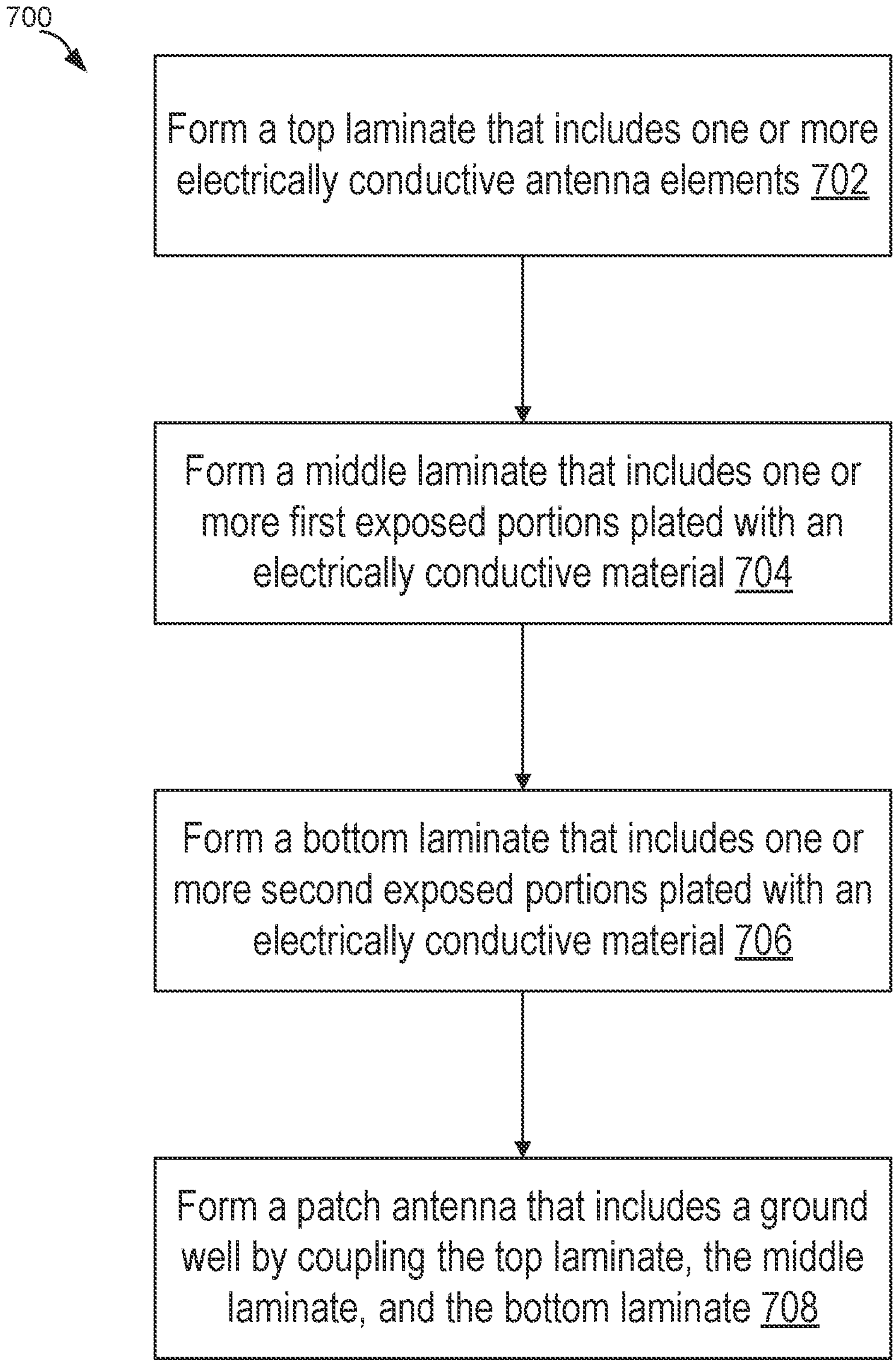
FIG. 7 depicts a flowchart of a process for forming the patch antenna of FIG. 2 according to an embodiment.

FIG. 7 is a flowchart of a process 700 for manufacturing a patch antenna 102 according to an embodiment. At block 702, a top laminate 106 is formed. The top laminate 106 may be or include laminate material such as a dielectric material, a polymeric material, another non-conductive material, etc. Additionally, the top laminate 106 may include one or more electrically conductive antenna elements. For example, the top laminate 106 can include the electrically conductive antenna element 112, the second electrically conductive antenna element 225, or a combination thereof. In a particular example, the top laminate 106 can include the electrically conductive antenna element 112 and the second electrically conductive antenna element 225 separated from one another by a dielectric material or other suitable laminate material. Additionally or alternatively, the top laminate 106 can include at least a portion of one or more channels (e.g., the channels 215*a-c*) that can extend through the thickness of the top laminate 106.

At block 704, a middle laminate 104 is formed. The middle laminate 104 may be or include laminate material such as a dielectric material, a polymeric material, another non-conductive material, etc. Additionally, the middle laminate 104 may include one or more exterior surfaces, or portions thereof, that can be plated with an electrically conductive material. For example, the middle laminate 104 may include the second component 210*b* of the ground well 208 that may be formed on at least a portion of a lower exterior surface of the middle laminate 104. The second component 210*b* of the ground well 208 may be formed by plating or may otherwise include forming the electrically conductive material. Examples of the electrically conductive material can include copper, silver, aluminum, titanium, other electrically conductive elements, any alloys thereof, or any combination thereof.

At block 706, a bottom laminate 202 is formed. The bottom laminate 202 may be or include laminate material such as a dielectric material, a polymeric material, another non-conductive material, etc. Additionally, the bottom laminate 202 may include one or more exterior surfaces, or portions thereof, that can be plated with an electrically conductive material. For example, the bottom laminate 202 may include the first component 210*a* of the ground well 208 that may be formed on at least a portion of an exterior surface of the bottom laminate 202. The first component 210*a* of the ground well 208 may be formed by plating or may otherwise include forming the electrically conductive material. Examples of the electrically conductive material can include copper, silver, aluminum, titanium, other electrically conductive elements, any alloys thereof, or any combination thereof.

At block 708, a patch antenna 102 can be formed with the top laminate 106, the middle laminate 104, and the bottom laminate 202. The top laminate 106 can be coupled to a first side of the middle laminate 104, and the bottom laminate 202 can be coupled to a second side opposite the first side of the middle laminate 104. In some embodiments, coupling the middle laminate 104 and the bottom laminate 202 can form the ground well 208, which may be or include a bottom surface of the patch antenna 102 that can function as an electrical ground plane for the patch antenna 102. In a particular example, the ground well 208 can be formed by or otherwise include the first component 210*a* and the second component 210*b*. Additionally or alternatively, a cross-section of the ground well 208 can be or include a U-shape, a step-shape, or any other suitable shape for the ground well 208.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A Global Navigation Satellite System (GNSS) patch antenna comprising:

- a middle laminate comprising a first side and a second side opposite the first side;
- a top laminate coupled to the middle laminate and positioned on the first side of the middle laminate, the top laminate including at least one electrically conductive antenna element configured to receive GNSS signals;
- a bottom laminate coupled to the middle laminate and positioned on the second side of the middle laminate;
- a ground well covering exposed surfaces of the bottom laminate and at least an exposed portion of a surface of the second side of the middle laminate, the ground well comprising an electrically conductive material, wherein at least a portion of the surface of the middle laminate that is covered by the bottom laminate is free from the electrically conductive material; and a plurality of channels extending from an upper one of the at least one electrically conductive antenna element of the top laminate to a first side of the bottom laminate, wherein the first side of the bottom laminate is positioned opposite from a second side of the bottom laminate that is adjacent to the second side of the middle laminate.

2. The GNSS patch antenna of claim 1, wherein the at least one electrically conductive antenna element has a geometrical shape similar to a geometrical shape of the top laminate, and wherein the at least one electrically conductive antenna element comprises copper.

3. The GNSS patch antenna of claim 1, wherein the middle laminate defines a first three-dimensional shape, wherein the top laminate defines a second three-dimensional shape, wherein the bottom laminate defines a third three-dimensional shape, wherein at least two dimensions of each of the first three-dimensional shape, the second three-dimensional shape, and the third three-dimensional shape are geometrically similar.

4. The GNSS patch antenna of claim 3, wherein the first three-dimensional shape, the second three-dimensional shape, and the third three-dimensional shape are each differently sized cylindrical shapes, and wherein the first three-dimensional shape has a first radius that is larger than a second radius of the second three-dimensional shape and a third radius of the third three-dimensional shape.

5. The GNSS patch antenna of claim 1, further comprising a plurality of conduction pins corresponding to the plurality of channels, wherein each conduction pin of the plurality of conduction pins is positioned in a different channel of the plurality of channels.

6. The GNSS patch antenna of claim 5, wherein each conduction pin of the plurality of conduction pins comprises a plurality of vias connected by one or more connection pads, and wherein each conduction pin of the plurality of conduction pins is adjacent to but does not contact electrically conductive elements in the middle laminate or the bottom laminate.

7. The GNSS patch antenna of claim 1, wherein the ground well increases a volume of the GNSS patch antenna to optimize a detectable frequency range associated with the GNSS patch antenna.

8. A system including a plurality of Global Navigation Satellite System (GNSS) patch antennas, comprising:

a first GNSS patch antenna comprising:

an antenna board comprising a first side and a second side opposite the first side;

a first top laminate coupled to the antenna board and positioned on the first side of the antenna board, the first top laminate including at least one first electrically conductive antenna element configured to receive GNSS signals;

a first bottom laminate coupled to the antenna board and positioned on the second side of the antenna board;

a first ground well covering exposed surfaces of the first bottom laminate and at least an exposed portion of a surface of the second side of the antenna board, the first ground well comprising an electrically conductive material, wherein at least a portion of the surface of the antenna board that is covered by the first bottom laminate is free from the electrically conductive material; and a first plurality of channels extending from an upper one of the at least one first electrically conductive antenna element of the first top laminate to a first side of the first bottom laminate, wherein the first side of the first bottom laminate is positioned opposite from a second side of the first bottom laminate and is adjacent to the second side of the antenna board; and a second GNSS patch antenna comprising:

a second top laminate coupled to the antenna board and positioned on the first side of the antenna board, the second top laminate including at least one second electrically conductive antenna element configured to receive GNSS signals;

a second bottom laminate coupled to the antenna board and positioned on the fourth second side of the antenna board;

a second ground well covering exposed surfaces of the second bottom laminate and at least an exposed portion of a surface of the second side of the antenna board, the second ground well comprising an electrically conductive material, wherein at least a portion of the surface of the antenna board that is covered by the second bottom laminate is free from the electrically conductive material; and a second plurality of channels extending from an upper one of the at least one second electrically conductive antenna elements of the second top laminate to a first side of the second bottom laminate, wherein the first side of the second bottom laminate is positioned opposite from a second side of the second bottom laminate that is adjacent to the second side of the antenna board.

9. The system of claim 8, wherein:

the at least one first electrically conductive antenna element has a geometrical shape similar to a geometrical shape of the first top laminate and is comprised of copper; and the at least one second electrically conductive antenna element has a geometrical shape similar to a geometrical shape of the second top laminate and is comprised of copper.

10. The system of claim 8, wherein:

the first top laminate defines a first three-dimensional shape, the first bottom laminate defines a second three-dimensional shape, and at least two dimensions of the first three-dimensional shape and the second three-dimensional shape are geometrically similar; and the second top laminate defines a third three-dimensional shape, the second bottom laminate defines a fourth three-dimensional shape, and at least two dimensions of the third three-dimensional shape and the fourth three-dimensional shape are geometrically similar.

11. The system of claim 10, wherein:

the first three-dimensional shape and the second three-dimensional shape are differently sized cylindrical shapes; and the third three-dimensional shape and the fourth three-dimensional shape are differently sized cylindrical shapes.

12. The system of claim 11, wherein the first three-dimensional shape is the same as the third three-dimensional shape, wherein the second three-dimensional shape is the same as the fourth three-dimensional shape.

13. The system of claim 8, further comprising:

a first plurality of conduction pins corresponding to the first plurality of channels, wherein each conduction pin of the first plurality of conduction pins is positioned in a different channel of the first plurality of channels; and a second plurality of conduction pins corresponding to the second plurality of channels, wherein each conduction pin of the second plurality of conduction pins is positioned in a different channel of the second plurality of channels.

14. The system of claim 13, wherein:

each conduction pin of the first plurality of conduction pins comprises a first plurality of vias connected by one or more connection pads, and wherein each conduction pin of the first plurality of conduction pins is adjacent to but does not contact electrically conductive elements in the antenna board or the first bottom laminate; and each conduction pin of the second plurality of conduction pins comprises a second plurality of vias connected by one or more connection pads, and wherein each conduction pin of the second plurality of conduction pins is adjacent to but does not contact electrically conductive elements in the antenna board or the second bottom laminate.

15. The system of claim 8, wherein the first ground well increases a volume of the first GNSS patch antenna to optimize a detectable frequency range associated with the first GNSS patch antenna, and wherein the second ground well increases a volume of the second GNSS patch antenna to optimize a detectable frequency range associated with the second GNSS patch antenna.

16. The system of claim 8, wherein the first bottom laminate is at substantially the same height as the second bottom laminate; and the first GNSS patch antenna and the second GNSS patch antenna are arranged laterally offset from one another on the antenna board.

17. A ground well layer for a Global Navigation Satellite System (GNSS) patch antenna, the ground well layer comprising:

a housing having a first side and a second side, wherein:

the first side is coupled to a first side of a middle laminate of the GNSS patch antenna, and the second side is plated with an electrically conductive material; and a plurality of channels extending through the housing, wherein each channel of the plurality of channels is sized to receive a different conduction pin of a plurality of conduction pins, wherein each conduction pin of the plurality of conduction pins is configured to extend within a respective channel of the plurality of channels and to a patch of a top laminate of the GNSS patch antenna.

* * * * *